United States Patent
Ashikhmin et al.

(10) Patent No.: US 9,306,643 B2
(45) Date of Patent: Apr. 5, 2016

(54) DECENTRALIZED SLOW-FADING PRECODING FOR MULTI-CELL WIRELESS SYSTEMS

(71) Applicant: Alcatel-Lucent USA Inc., Murray Hill, NJ (US)

(72) Inventors: Alexei Ashikhmin, Morristown, NJ (US); Thomas L. Marzetta, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 118 days.

(21) Appl. No.: 14/043,224

(22) Filed: Oct. 1, 2013

(65) Prior Publication Data
US 2015/0092873 A1    Apr. 2, 2015

(51) Int. Cl.
| | |
|---|---|
| H04B 7/02 | (2006.01) |
| H04B 7/04 | (2006.01) |
| H04J 11/00 | (2006.01) |
| H04L 25/03 | (2006.01) |
| H04B 7/06 | (2006.01) |

(52) U.S. Cl.
CPC ............ *H04B 7/0456* (2013.01); *H04B 7/0617* (2013.01); *H04J 11/005* (2013.01); *H04L 25/03955* (2013.01)

(58) Field of Classification Search
USPC .......... 370/328, 329, 280; 375/299, 260, 131, 375/E01.033; 714/748; 455/450, 452.1, 455/296, 67.11, 39
See application file for complete search history.

(56) References Cited

U.S. PATENT DOCUMENTS

| | | | |
|---|---|---|---|
| 6,122,628 A * | 9/2000 | Castelli et al. | |
| 8,838,127 B2 * | 9/2014 | Chen et al. | 455/450 |
| 2005/0094738 A1 | 5/2005 | Park et al. | |
| 2008/0144738 A1 * | 6/2008 | Naguib | 375/299 |
| 2009/0279486 A1 * | 11/2009 | Kishigami et al. | 370/329 |
| 2010/0056171 A1 * | 3/2010 | Ramprashad et al. | 455/452.1 |
| 2011/0150113 A1 | 6/2011 | Oyman et al. | |
| 2013/0142128 A1 * | 6/2013 | Yang et al. | 370/329 |

OTHER PUBLICATIONS

U.S. Appl. No. 13/751,470, pp. 2-5.*

(Continued)

*Primary Examiner* — Phuongchau Ba Nguyen
(74) *Attorney, Agent, or Firm* — Chiesa Shahinian & Giantomasi PC

(57) ABSTRACT

Methods and apparatuses for slow-fading precoding for multi-cell wireless systems are provided. At a base station of a cellular network in which a plurality of terminals are served, the base station serving pluralities of same-cell terminals and neighboring-cell terminals, and the cellular network including neighboring-cell base stations that serve respective pluralities of same-cell terminals and neighboring-cell terminals, a same-cell and one or more neighboring cells within the cellular network are selected, the same-cell and one or more neighboring cells comprising a truncated network. A plurality of slow-fading coefficients is obtained, each of the plurality of slow-fading coefficients being associated with channel state information for communication within the truncated network between a neighboring-cell base station and one of the respective same-cell terminals or neighboring-cell terminals, and a set of slow-fading precoding coefficients is generated for transmitting signals within the truncated network to same-cell terminals and neighboring-cell terminals based on the plurality of slow-fading coefficients.

21 Claims, 7 Drawing Sheets

(56) References Cited

OTHER PUBLICATIONS

U.S. Appl. No. 13/329,834, pp. 2-7.*
Ashikhmin et al (Pilot Contamination Precoding in Multi-Cell Large Scale Antenna Systems), pp. 1137-1141.*
Peters et al (Cooperative Algorithms for MIMO Interference Channels), pp. 206-218.*
Office Action mailed on Mar. 20, 2015, in connection with Taiwanese Patent Application No. 103102260, 8 pgs.
T.L. Marzetta, "Noncooperative Cellular Wireless with Unlimited Numbers of Base Station Antennas," IEEE Trans. on Wireless Communications 9 (Nov. 2010) pp. 3590-3600.
Ashikhmin, Alexei, et al., "Pilot Contamination Precoding in Multi-Cell Large Scale Antenna Systems," Jul. 1, 2012, 2012 IEEE International Symposium on Information Theory Proceedings, pp. 1137-1141.
Yu, Shu-Yan, et al. "Linear Precoding and Power Allocation Optimization with Partial CSI under per BS Power Constraints for Cooperative MIMO TDD Systems," Dec. 3, 2012, Globecom 2012—Signal Proceedings for Communications Symposium, Global Communications Conference, pp. 3795-3800.
Holakouei, Reza, et al. "Precoded Multiuser Distributed MIMO OFDM Systems," Sep. 7, 2009, Wireless Communications Systems, 6th International Symposium, pp. 605-608.
International Search Report and Written Opinion mailed on May 9, 2014, in connection with international patent application No. PCT/US2014/012709, 12 pgs.
International Search Report and Written Opinion mailed on Jan. 5, 2015, in connection with international patent application No. PCT/US2014/058266, 14 pgs.
Huh et al., "Achieving "Massive MIMO" Spectral Efficiency with a Not-so-Large Number of Antennas," IEEE Transactions on Wireless Communications, vol. 1, No. 9, Sep. 1, 2012, pp. 3226-3239.
Garcia et al., "Dynamic Cooperation Set Clustering on Base Station Cooperation Cellular Networks," Personal Indoor and Mobile Radio Communications (PIMRC), 2010 IEEE 21st, International Emposium on, IEEE, Sep. 26, 2010, pp. 2127-2132.
Fernandes et al., "Inter-Cell Interference in Noncooperative TDD Large Scale Anetnna Systems," IEEE Journal on Selected Areas in Communications, vol. 31, No. 2, Feb. 1, 2013, pp. 192-201.
Mazroui-Sebdani et al., "Massive MIMO with Clustered Pilot Contamination Precoding,"2013 Asilomar Conference on Signals, Systems and Computers, IEEE, Nov. 3, 2013, pp. 1218-1222.
Li Liangbin et al., "Pilot Contamination Precoding for Interference Reducation in Large Scale Antenna Systems," 2013 51st Annual Allerton Confernce on Communication, Control, and Computing (Allerton), IEEE, Oct. 2, 2013, pp. 226-232.
Stevens et al., "Cooperative Algorithms for MIMO Interference Channels," IEEE Transactions on Vehicular Technology, vol. 60, No. 1, Jan. 1, 2011, pp. 206-218.

* cited by examiner

DECENTRALIZED SLOW-FADING PRECODING FOR MULTI-CELL WIRELESS SYSTEMS

TECHNICAL FIELD

The present disclosure is generally directed to wireless communication systems that use multiple antennas to achieve improved network performance.

BACKGROUND

It has long been known that techniques of spatial multiplexing can be used to improve the spectral efficiency of wireless networks. (Spectral efficiency describes the transmitted data rate per unit of frequency, typically in bits per second per Hz.) In typical examples of spatial multiplexing, a multiple array of transmit antennas sends a superposition of messages to a multiple array of receive antennas. The channel state information (CSI), i.e., the channel coefficients between the respective transmit-receive antenna pairs, is assumed known. Provided that there is low correlation among the respective channel coefficients, the CSI can be used by the transmitter, or the receiver, or both, to define a quasi-independent channel for each of the transmitted messages. As a consequence, the individual messages are recoverable at the receiving antenna array.

More recently, experts have proposed extensions of the spatial multiplexing technique, in which a multiplicity of mobile or stationary user terminals (referred to herein as "terminals") are served simultaneously in the same time-frequency slots by an even larger number of base station antennas or the like, which we refer to herein as "service antennas", or simply as "antennas". Particularly when the number of service antennas is much greater than the number of terminals, such networks may be referred to as "Large-Scale Antenna Systems" (LSAS).

Theoretical studies predict that the performance of LSAS networks scales favorably with increasing numbers of service antennas. In particular, there are gains not only in the spectral efficiency, but also in the energy efficiency. (The energy efficiency describes the ratio of total data throughput to total transmitted power, and is measured, e.g., in bits per Joule.)

One such study is T. L. Marzetta, "Noncooperative Cellular Wireless with Unlimited Numbers of Base Station Antennas," *IEEE Trans. on Wireless Communications* 9 (November 2010) 3590-3600, hereinafter referred to as "Marzetta 2010".

In some approaches, the base stations may obtain CSI through a procedure that relies on time-division duplex (TDD) reciprocity. That is, terminals send pilot sequences on the reverse link, from which the base stations can estimate the CSI. The base stations can then use the CSI for beam-forming. This approach works well when each terminal can be assigned one of a set of mutually orthogonal pilot sequences.

Generally, it is considered advantageous for the terminals to synchronously transmit all pilot sequences on a given frequency, and possibly even on all frequencies, making use of the mutual orthogonality of the pilot sequences.

The number of available orthogonal pilot sequences, however, is relatively small, and can be no more than the ratio of the coherence time (an interval during which prevailing channel conditions between a base station and a terminal are assumed to be static) to the delay spread (the difference between the time of arrival of the earliest significant multipath component and the time of arrival of the latest multipath component). Terminals within a single cell can use orthogonal pilot sequences, but terminals from the neighboring cells will typically be required to reuse at least some of the same pilot sequences. This reuse of pilot sequences in different cells creates the problem of pilot contamination. The pilot contamination causes a base station to beam-form its message-bearing signals not only to the terminals located in the same cell, but also to terminals located in the neighboring cells. This phenomenon is known as directed interference. The directed interference does not vanish as the number of base station antennas increases. In fact, the directed inter-cell interference—along with the desired signals—grows in proportion to the number of base station antennas.

As shown in Marzetta 2010, for example, as the number of base station antennas grows in an LSAS network, inter-cell interference arising from pilot contamination will eventually emerge as the dominant source of interference.

One approach for suppressing inter-cell interference and thus achieving even greater signal to interference and noise ratios (SINRs, or singularly, SINR) has been to subdivide an LSAS network into clusters. Cluster-based schemes exist for mitigating directed inter-cell interference for cells within each respective cluster.

However, one disadvantage of the cluster-based approach to suppressing inter-cell interference is the likelihood of inter-cluster interference for terminals located along a cluster perimeter. The number of terminals located along a cluster perimeter is typically large, particularly in the case of a large network in which there are many clusters. Thus, a significant portion of terminals may be affected by inter-cluster interference and served with relatively low data transmission rates. Further, increasing the size of clusters to lower the amount of terminals located along a cluster perimeter will also increase the size of cluster perimeters, making it more likely that a larger number of terminals will be located relatively near to a cluster perimeter at a given time. In addition, larger clusters may require cooperation between relatively larger numbers of base stations, which also can increase complexity.

SUMMARY

In order to address disadvantages of current means for suppressing inter-cell interference, methods and apparatuses for decentralized slow fading pre-coding for multi-cell wireless systems are provided. In accordance with an embodiment, at a base station of a cellular network in which a plurality of terminals are served, the base station serving pluralities of same-cell terminals and neighboring-cell terminals, and the cellular network including neighboring-cell base stations that serve respective pluralities of same-cell terminals and neighboring-cell terminals, a same-cell and one or more neighboring cells within the cellular network are selected, the same-cell and one or more neighboring cells comprising a truncated network. A plurality of slow-fading coefficients is obtained, each of the plurality of slow-fading coefficients being associated with channel state information for communication within the truncated network between a neighboring-cell base station and one of the respective same-cell terminals or neighboring-cell terminals, and a set of slow-fading precoding coefficients is generated for transmitting signals within the truncated network to same-cell terminals and neighboring-cell terminals based on the plurality of slow-fading coefficients. One or more of the same-cell and the one or more neighboring cells may be selected by a neighboring-cell base station to comprise a neighboring truncated network that intersects with the truncated network.

In accordance with an embodiment, generating the set of slow-fading precoding coefficients may comprise determining optimized slow-fading precoding coefficients.

In accordance with an embodiment, each optimized slow-fading precoding coefficient may be determined based on one of maximizing a minimum signal to interference and noise ratio, maximizing a sum of data transmission rates, or maximizing a sum of logarithms of data transmission rates for transmitting a signal to same-cell terminals and other-cell terminals.

In accordance with an embodiment, generating the set of slow-fading precoding coefficients may include performing an iterative function, wherein the iterative function may be terminated based on a precision control threshold. The iterative function may include a quasi-convex optimization algorithm.

In accordance with an embodiment, data signals intended for one or more of the same-cell terminals and neighboring-cell terminals located within the truncated network may be received.

In accordance with an embodiment, the base station may comprise a central hub of the truncated network.

In accordance with an embodiment, pilot signals may be obtained from the pluralities of same-cell terminals and neighboring-cell terminals, and signals may be beam-formed to one or more of the same-cell terminals and neighboring-cell terminals based on the set of slow-fading precoding coefficients. The beam-forming may be based on a set of fast-fading coefficients, and may be performed using orthogonal frequency-division multiplexing (OFDM) modulation.

These and other advantages of the invention will be apparent to those of ordinary skill in the art by reference to the following detailed description and the accompanying drawings.

DETAILED DESCRIPTION

Figure 1:
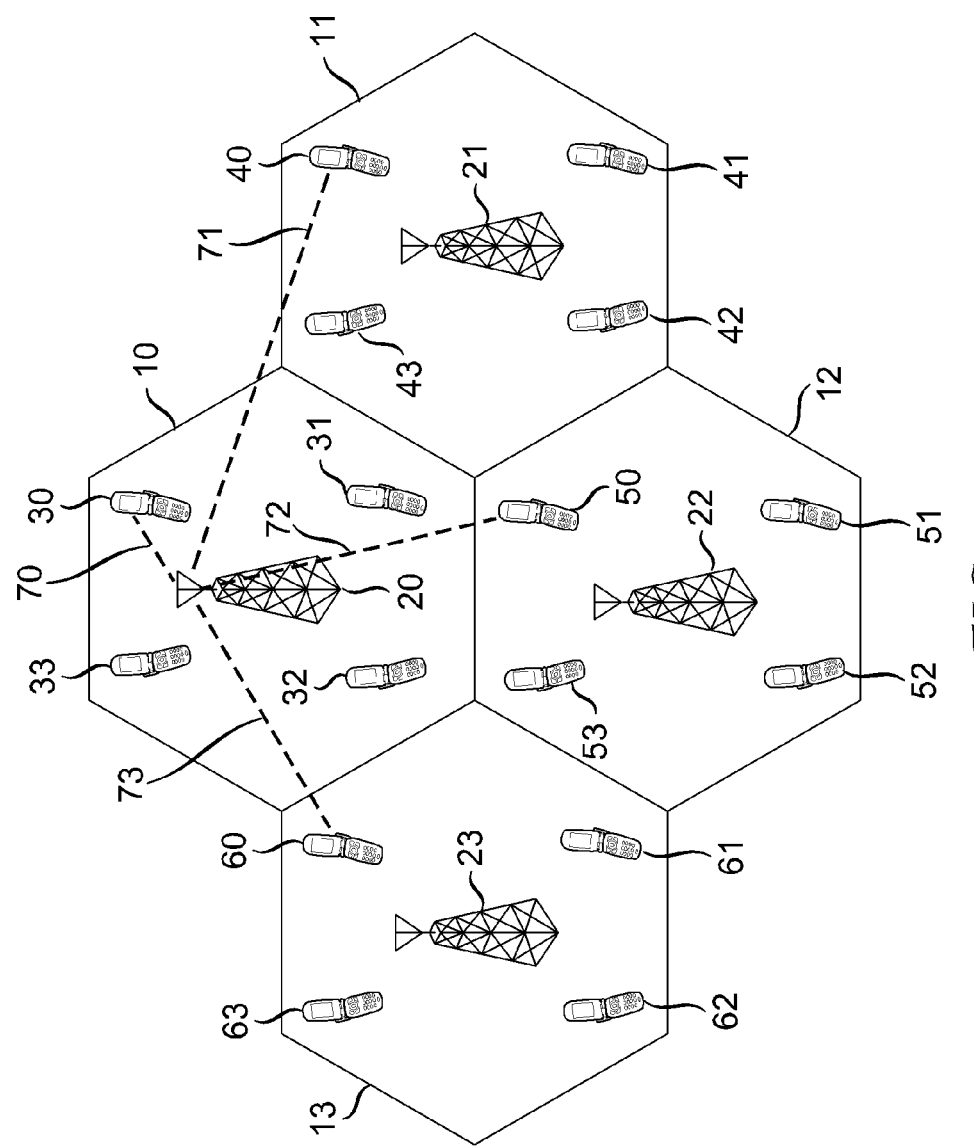
FIG. 1 is a schematic drawing of a portion of an LSAS network, illustrating inter-cell interference due to pilot contamination.

In accordance with the various embodiments, a message-carrying signal transmitted from a base station antenna array during one channel use interval is referred to herein as a "symbol". A symbol is distributed in space and frequency, because each base station has multiple antennas for transmission, and because each symbol will typically be distributed over multiple OFDM subcarriers or "tones".

The term "antenna" refers to a base station antenna associated with a cell. Each cell has at most M antennas. The term "terminal" refers to a static or mobile user terminal.

The total number of cells is L. Each cell contains at most K terminals. The total number of pilot signals is K. The pilot signals are numbered 1, ..., K. The pilot signals are assumed to be allocated to terminals such that in each cell, the k-th terminal is allocated pilot signal k.

For example, antenna mj is the m-th antenna of cell j. Terminal kl is the k-th terminal of cell l.

The term "same-cell" refers to a spatial location of an element from a base station's perspective. For example, for a base station located within cell j, the term same-cell terminal refers to a terminal located within cell j.

The term "neighboring cell" may also refer to a spatial location from a base station's perspective. For example, for a base station located within cell j, a neighboring-cell terminal may refer to a terminal located within another cell that shares a perimeter boundary with cell j. Alternatively, a neighboring-cell terminal may refer to a terminal located within another cell that is within transmission range of an antenna of the base station located within cell j, but does not share a perimeter boundary with cell j.

For tone n, the channel coefficient between antenna mj and terminal kl is $g_{nmj}^{[kl]}$. An M×K channel matrix $G_{lj}$ is defined between the base station of cell j and the terminals of cell l by:

$$[G_{jl}]_{m_1 k_1} = g_{nmj}^{[kl]}; \ m=m_1; k=k_1. \qquad (1)$$

The channel coefficient g may be factored into a fast-fading coefficient h and a slow-fading coefficient $\beta^{1/2}$:

$$g_{nmj}^{[kl]} = h_{nmj}^{[kl]} \cdot (\beta_j^{[kl]})^{1/2}.$$

The h coefficients, which represent fast-fading, can change with as little as ¼ wavelength of motion. On the other hand, the fading behavior represented by the β coefficients, is slowly varying. Although the β coefficients (i.e., the slow-fading coefficients) are often referred to as shadow fading coefficients, this fading is typically a combination of geometric attenuation and shadow fading. Typically, β is constant over frequency and slowly varying over space and time. By contrast, fast-fading h coefficients typically change rapidly over space and time. In frequency, fast-fading varies over frequency intervals that are the reciprocal of the channel delay spread. Without loss of generality in the mathematical analysis below, the assumption can be made that the h coefficients have unit variance (because the multiplicative decomposition of g is non-unique). Hereinafter, the tone index n will be suppressed from this notation for ease of understanding.

As referred to above, the slow-fading coefficient β has been indexed for the base station of cell j and the k-th terminal of cell l. It has not been indexed for an individual antenna of the base station of cell j because these coefficients are assumed quasi-independent of spatial location, at least on the spatial scale of an antenna array.

FIG. 1 is a schematic drawing of a portion of an LSAS network, illustrating inter-cell interference due to pilot contamination. FIG. 1 shows a portion of a cellular network, including cells 10-13, having respective base stations 20-23. A plurality of mobile terminals is shown in each cell, respectively labeled 30-33, 40-43, 50-53, and 60-63. To simplify the drawing, each of the base stations is treated as having only a single antenna.

In forward-link transmission, base station 20, for example, transmits a message to terminal 30 on path 70. If terminals 40, 50, and 60 have been assigned the same pilot signal as terminal 30, pilot contamination may cause the transmitted message to interfere on paths 71, 72, and 73 to terminals 40, 50, and 60, respectively.

Conversely, in reverse-link transmission, terminal 30 transmits a message to base station 20 on path 70. (For purposes of this illustration, we are treating paths 70-73 as bidirectional.) Pilot contamination may cause the reverse-link messages on paths 71-73 to interfere, at base station 20, with the reverse-link message transmitted from terminal 30 on path 70.

Figure 2:
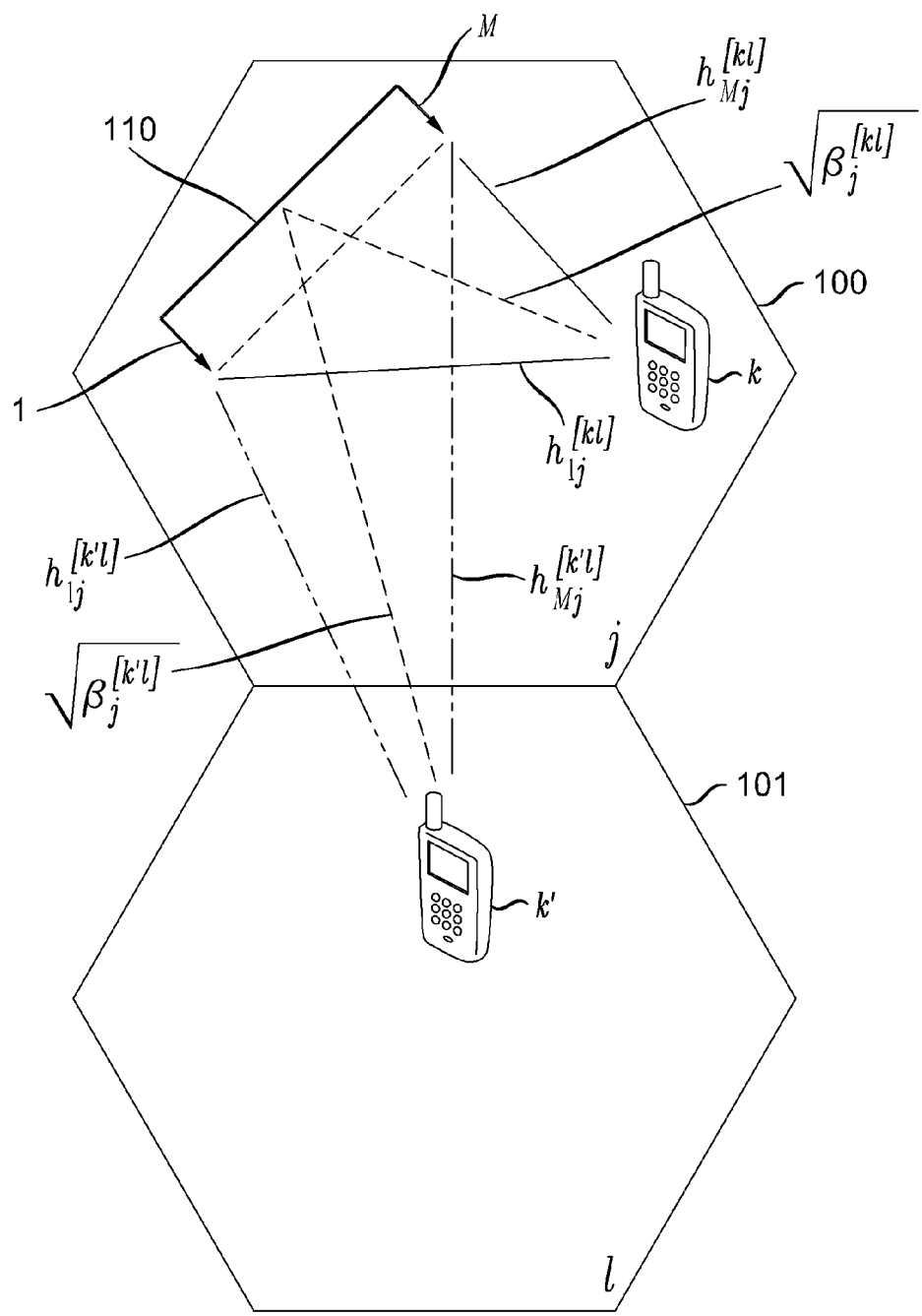
FIG. 2 is a schematic drawing of a portion of an LSAS network, illustrating a distinction between fast-fading coefficients and slow-fading coefficients.

FIG. 2 is a schematic drawing of a portion of an LSAS network, illustrating a distinction between fast-fading coefficients and slow-fading coefficients. FIG. 2 shows a portion of a cellular network, including cells 100 and 101. To illustrate what is meant by fast-fading and slow-fading coefficients, the figure includes base station antenna array 110 of cell 100, mobile terminal k of cell 100, and mobile terminal k' of cell 101. To simplify the figure, all other features of the cells have been omitted. As indicated in the figure, cell 100 is cell j for purposes of this illustration, and cell 101 is cell I. Antenna array 110 includes M antennas, of which antenna 1 and antenna M have been explicitly shown. Although antenna array 110 has been drawn, for convenience, as a linear array, it should be noted that there is no requirement for the geographical distribution of antennas to take a linear shape, or any other particular shape. Likewise, the scale of the linear antenna array has been drawn, solely for convenience, as comparable to the size of the cell. There is no limitation on the geographical scale of the antenna array, except that it will generally be advantageous to space the antennas apart by at least one-half wavelength to minimize electromagnetic coupling between antennas.

In FIG. 2, propagation paths from antenna 1 to terminal k, antenna 1 to terminal k', antenna M to terminal k, and antenna M to terminal k' have been respectively labeled with the fast-fading coefficients $h_{1j}^{[kj]}$, $h_{1j}^{[k'j]}$, $h_{Mj}^{[kj]}$, and $h_{Mj}^{[k'j]}$. Two slow-fading coefficients are also indicated. They are $\sqrt{\beta_j^{[kj]}}$ from antenna array 110 to terminal k of cell j, and $\sqrt{\beta_j^{[k'j]}}$ from antenna array 110 to terminal k' of cell I. Other fast-fading coefficients from intermediate antennas of array 110 to the respective terminals are indicated only by broken lines.

In the following discussion, OFDM signal modulation is assumed to be used for both forward link and reverse link signals. It should be understood, however, that the embodiments herein are not limited to OFDM, but may be implemented using other modulation techniques such as time-reversal modulation or CDMA modulation.

In a time-division duplexing multi-cell wireless network (also referred to herein as a TDD network, or simply as a network), each cell includes a base station. Each base station is equipped with M antennas, and terminals are equipped with one antenna each. The number of base station antennas M is typically relatively large, as the performance of multi-cell wireless networks typically grows proportionally with the number of antennas. For example, the number of antennas M may be between 20 to 1000 antennas or more.

A coherence interval T defines an interval during which prevailing channel conditions between base stations and mobile terminals are assumed to be static (i.e., the channel conditions do not change). For example, in high-level downlink transmission protocol terminals in all cells may synchronously send pilot sequences. The pilot sequences propagate to all antennas of all base stations. Each base station uses these pilot sequences to estimate CSI (channel vectors) between each of its antenna and in-cell mobile terminals. Each estimated CSI value will be assumed to be valid for the duration of a coherence interval. The base stations then may use their CSI estimates to synchronously beam-form signals to the terminals located within their cells (i.e., to same-cell terminals).

The beam-forming technique significantly reduces interference between signals sent to different terminals. For example, in each cell there may be K terminals (K same-cell terminals) enumerated by integers 1, ..., K. The K terminals may employ K unique pilot sequences for communication with base stations. Likewise, terminals in different cells (i.e., other-cell terminals) may use the same set of K orthogonal pilot sequences $r_1, \ldots r_K$, $r_i^* r_j = 0$. As such, in each cell the k-th terminal will communicate via the pilot sequence $r_k$.

Current TDD networks may achieve data uplink and downlink transmission rates that are significantly higher than in LTE systems. However, various issues inherent in such systems have until now prevented further increases in data transmission rates. These issues include: (1) directed inter-cell interference caused by pilot contamination, (2) channel estimation error, (3) non-orthogonal channel vectors, and (4) beam-forming gain uncertainty at terminals.

Directed inter-cell interference caused by pilot contamination describes a condition caused by terminal pilot sequences. Typically, pilot sequences are relatively short, since terminals can move fast throughout a network. A consequence of short pilot sequences is that the number of orthogonal of sequences is small. Therefore, a network may not include enough orthogonal pilot sequences for all terminals, e.g., for neighboring-cell terminals from a same-cell base station perspective. In practice, pilot contamination can result from the unavoidable use of non-orthogonal pilot sequences. Because of pilot contamination, inter-cell interference may not disappear even if the number of base stations antennas M tends to infinity.

Channel estimation error describes an instance where a base station estimates CSI with an error. As typical pilot sequences are relatively short, channel estimation errors can be significant. In practice, a base station that beam-forms signals including a channel estimation error can result in interference within the network.

When the number of base station antennas M tends to infinity, the CSI, that is the channel vectors $g_j^{[kl]} = (g_{1j}^{[kl]}, g_{2j}^{[kl]}, \ldots g_{Mj}^{[kl]})$, $g_{j'}^{[k'l']} = (g_{1j'}^{[k'l']}, g_{2j'}^{[k'l']}, \ldots g_{Mj'}^{[k'l']})$, between base stations and different terminals generally becomes mutually orthogonal (i.e. $\lim_{M \to \infty} g_{1j}^{[kl]}, g_{2j}^{[kl]}, \ldots g_{Mj}^{[kl]})$, $g_{j'}^{[k'l']} = (g_{1j'}^{[k'l']}, g_{2j'}^{[kl]}, \ldots g_{Mj'}^{[k'l']})$, (j,k,l)≠(j',k',l'), thus allowing for the avoidance of downlink interference. In reality, however, wherein the number of base station antennas M is finite, the channel vectors are non-orthogonal and can cause network interference.

Beam-forming gain uncertainty results from when a terminal does not have accurate information regarding the effective channel gain between itself and its same-cell base station. As a result, the terminal can only estimate the channel gain. The estimation error can reduce the SINR achieved during communications with the terminal.

Figure 3:
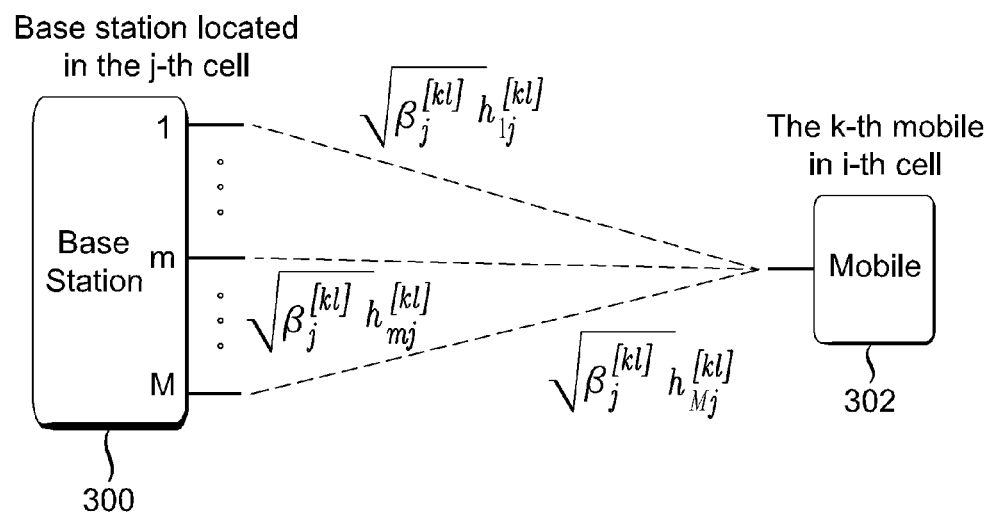
FIG. 3 is a schematic drawing illustrating channel vectors between a base station and a neighboring-cell terminal in accordance with an embodiment.

FIG. 3 is a schematic drawing illustrating channel vectors between a base station and a neighboring-cell terminal in accordance with an embodiment. Channel vectors (CSI) are shown between the j-th cell base station 300 (also referred to herein as base station j) and the k-th terminal 302 located in the l-th cell. When a signal propagates from terminal 302 to the m-th antenna of base station 300, it is multiplied by the coefficient $\sqrt{\beta_j^{[kl]}} h_{mj}^{[kl]}$ Downlink and uplink reciprocity can be assumed, so when a signal propagates from the m-th antenna of base station j 300 to the k-th mobile terminal 302, the signal is multiplied by the same coefficient $\sqrt{\beta_j^{[kl]}} h_{mj}^{[kl]}$.

The coefficient $\beta_j^{[kl]}$ is a slow-fading coefficient. $\beta_j^{[kl]}$ is a real number that changes relatively slowly. In general, the slow-fading coefficient is the same for all antennas of base station j, and is the same for all frequencies of an OFDM channel.

The coefficient $h^{[kl]}$ is a fast-fading coefficient. Unlike the slow-fading coefficient, the fast-fading coefficient can change as soon as a (mobile) terminal moves for ¼ of a wavelength. Further, the fast-fading coefficient is a complex number that depends on an antenna index (e.g., each of the M antennas can have its own fast-fading coefficient), and on the particular frequency of an OFDM channel. As such, fast-fading coefficients are difficult to estimate, and the number of fast-fading coefficients in a practical network will be very large. Indeed, the number of fast-fading coefficients at each base station is equal MKN, where K is the number of terminals within a given cell, and N is the number of frequency bins (frequencies) in the OFDM channel.

In contrast, slow-fading coefficients do not depend on an antenna index or the particular frequency of an OFDM channel. Rather, each base station has only K slow-fading coefficients corresponding to the number of same-cell terminals.

As such, in an embodiment neighboring-cell base stations can exchange slow-fading coefficients with each other, and data transmitted to terminals located in a j-th cell can also be obtained by base stations in all neighboring cells.

A communication protocol in accordance with an embodiment can be considered mathematically wherein T is the length of the coherence interval described above. Pilot sequences can be described as τ-tuples, e.g., any pilot sequence $r_k = (r_{k1}, r_{k2}, \ldots, r_{k\tau})^T$, where T means the transposition of a vector. The notation $\rho_r$ is the transmit power of a terminal. For example, all terminals may be assumed to have the same transmit power. The notation $\rho_f$ is the transmit power of a base station (e.g., all base stations may be assumed to have the same transmit power).

The notation $h_j^{[kl]}n = (h_{1j}^{[kl]}, h_{2j}^{[kl]}, \ldots h_{Mj}^{[kl]})$ is the fast-fading channel vector between the j-th base station 300 and the k-th terminal 302 located within the l-th cell (as shown in FIG. 3).

The notation $g_j^{[kl]} = \sqrt{\beta_j^{[kl]}}$ is the channel vector, which includes both slow-fading $\beta_j^{[kl]}$ and fast-fading coefficients $h_{mj}^{[kl]}$.

The notation $s^{[kj]}$ is the signal data for transmission to the k-th terminal located in the j-th cell, and L is the total number of cells in the network. Alternatively, L may be equal to the number of neighboring cells only or, as described below, the total number of cells in a truncated (virtual) network.

In an embodiment, each base station is adapted to estimate its slow-fading coefficients $\beta_j^{[kl]}$ and track the evolution of slow-fading coefficients. Base stations are further adapted to transmit their slow-fading coefficients $\beta_j^{[kl]}$ to a network hub. Any base station in a truncated network may perform the various functions of a network hub, as described below. Alternatively, the network hub may be an independent unit for performing the various functions described below that is located within the truncated network.

As such, when all terminals synchronously send their pilots sequences, the pilots sequences propagate to all neighboring base stations including the j-th base station, which receives at its M antennas the M×τ complex matrix:

$$Z_j = \sqrt{\rho_r} \sum_{k=1}^{K} \sum_{l=1}^{L} \sqrt{\beta_j^{[kl]}} h_j^{[kl]} r_k^T + W, \quad (1)$$

where $r_k^T$ is the transposition of $r_k$ and W is the additive noise.

In order to estimate CSI between the j-th Base Station and the k-th terminal, located in the j-th cell, the j-th Base Station computes the vector:

$$y_j^{[k]} = Z_j r_k \quad (2)$$

and further computes the minimum mean square error (MMSE) estimate of the channel vector $g^{[kj]}$ as $$\hat{g}_j^{[kj]} = \frac{\sqrt{\rho_r \tau} \beta_j^{[kj]}}{\sigma^2 + \sum_{l=1}^{L} \rho_r \tau \beta_j^{[kl]}} y_j^{[k]},$$

where $\sigma^2$ is the variance of the additive noise. The estimation error is defined by $$\tilde{g}^{[kj]} = g^{[kj]} - \hat{g}^{[kj]}.$$

Typically, the j-th base station transmits data signals $s^{[kj]}$, k=1, ..., K, for the K-th terminal located in the j-th cell. However, in accordance with an embodiment, the network hub (e.g., any base station in the truncated network) computes $KL^2$ j precoding coefficients $\alpha_r^{[kl]}$, $r=1, \ldots, L$; k=1 ... K; l=1, ..., L, where the slow-fading precoding coefficient $a_j^{[kl]}$ is a function of the slow-fading coefficients $\beta_j^{[kl]}$. The network hub then sends KL of the precoding coefficients, namely the precoding coefficients $a_j^{[kl]}$, k=1, ..., K; l=1, ..., L, to the j-th base station, which transmits signals $c_j^{[k]}$, k=1, ..., K, formed as linear combinations of the data signals $s^{[kj]}$, k=1, ..., K, and precoding coefficient $a_j^{[kl]}$:

$$c_j^{[k]} = \sum_{l=1}^{L} a_j^{[kl]} s^{[kl]},$$

$$k = 1, \ldots, K.$$

As such, the network hub can account for the slow-fading characteristics of interference signals between all neighboring base stations and terminals by optimizing the slow-fading precoding coefficient $a_j^{[kl]}$.

When signals $c_j^{[k]}$ are computed, the j-th base station can form a 1×M vector $$w_j = \sum_{k=1}^{K} c_j^k y_j^{[k]*},$$

and transmit the components of $w_j = (w_{1j}, w_{2j}, \ldots w_{Mj})$ from the corresponding antennas. This is known as conjugate precoding. One skilled in the art will note that conjugate precoding depends on fast-fading coefficients. Indeed, the vectors $y_j^{[k]}$, and further $w_j$ depend on fast-fading coefficients, which are available locally at the j-th base station. As such, no exchange of fast fading coefficients between base stations or between base stations and a network hub is required.

As described above, determining the slow-fading precoding coefficient $a_j^{[kl]}$ requires an exchange of only slow-fading coefficients between base stations and a network hub. At the same time the conjugate beam-forming depends on only locally known fast-fading coefficients, which are available to each base station.

Each variable is defined or known in the process described above except for an optimal value for the slow-fading precoding coefficient $a_j^{[kl]}$. In determining an optimal slow-fading precoding coefficient $a_j^{[kl]}$, it is helpful to have an understanding of the signals received by terminals from base stations. For example, the k-th terminal in the l-th cell receives $$y^{[kl]} = \frac{\sqrt{\rho_f}}{\sqrt{\gamma}} \sum_{j=1}^{L} w_j g_j^{[kl]}$$

$$= \frac{\sqrt{\rho_f}}{\sqrt{\gamma}} \sum_{j=1}^{L} \sum_{n=1}^{K} \sum_{v=1}^{L} y_j^{[n]*} \hat{g}_j^{[kl]} a_j^{[nv]} s^{[nv]} + \text{additive noise},$$

where γ is a power normalization factor. The above expression can be simplified to be represented by an expression of the form $$y^{[kl]} = n_0^{[kl]} s^{[kl]} + n_1^{[kl]} + n_2^{[kl]} + n_3^{[kl]} + n_4^{[kl]} + \text{additive noise},$$

where $$n_0^{[kl]} = \frac{\sqrt{\rho_f}}{\sqrt{\gamma}} \sum_{j=1}^{L} E[y_j^{[k]*} \hat{g}_j^{[kl]}] a_j^{[kl]}$$

$$n_1^{[kl]} = \frac{\sqrt{\rho_f}}{\sqrt{\gamma}} \sum_{j=1}^{L} \sum_{v=1, v\neq l}^{L} E[y_j^{[k]*} \hat{g}_j^{[kl]}] a_j^{[kv]} s^{[kv]}$$

$$n_2^{[kl]} = \frac{\sqrt{\rho_f}}{\sqrt{\gamma}} \sum_{j=1}^{L} \sum_{n=1}^{K} y_j^{[n]*} c_j^{[n]} \tilde{g}_j^{[kl]}$$

$$n_3^{[kl]} = \frac{\sqrt{\rho_f}}{\sqrt{\gamma}} \sum_{j=1}^{L} \sum_{n=1, n\neq k}^{K} y_j^{[n]*} c_j^{[n]} \hat{g}_j^{[kl]}$$

$$n_4^{[kl]} = \frac{\sqrt{\rho_f}}{\sqrt{\gamma}} \sum_{j=1}^{L} (y_j^{[k]*} \hat{g}_j^{[kl]} - E[y_j^{[k]*} \hat{g}_j^{[kl]}]) c_j^{[k]}$$

The interference terms $n_1^{[kl]}$, $n_2^{[kl]}$, $n_3^{[kl]}$, $n_4^{[kl]}$ correspond to the issues related to TDD networks discussed above. In particular, $n_1^{[kl]}$ is directed inter-cell interference caused by pilot contamination, $n_2^{[kl]}$ is directed to channel estimation error, $n_3^{[kl]}$ is directed to non-orthogonality of channel vectors, and $n_4^{[kl]}$ is directed to beam-forming gain uncertainty at terminals.

As such, after additional simplifications to the computations (that will be understood by those skilled in the art), it follows that the SINR value of the k-th terminal in the l-th cell is $$SINR^{[kl]} = \frac{E[|n_0^{[kl]}|^2]}{\sigma^2 + E[|n_1^{[kl]}|^2 + |n_2^{[kl]}|^2 + |n_3^{[kl]}|^2] + E[|n_4^{[kl]}|^2]} \quad (3)$$

Notably, the coefficients $a_j^{[kv]}$, directly or indirectly, affect the enumerator ($E[|n_0^{[kl]}|^2]$) and all terms in the denominator ($\sigma^2 + E[|n_1^{[kl]}|^2 + |n_2^{[kl]}| + |n_3^{[kl]}|] + E[|n_4^{[kl]}|^2]$). Thus, to achieve a feasible SINR (i.e., an SINR for which a successful signal transmission is possible) an optimal $a_j^{[kv]}$ must be found such that the slow-fading precoding coefficient makes the denominator small, and at the same time makes the enumerator as large as possible. As such, an optimization function for finding an optimal slow-fading precoding coefficient $a_j^{[kv]}$ can be formulated as:

$$\max_{a_j^{[kv]} \in R} \min_{k \cdot l} \log(1 + SINR^{[kl]}), \quad (4)$$

which is equivalent to the quasi-convex optimization function $$SINR = \max_{a_j^{[kv]} \in R} \min_{k \cdot l} SINR^{[kl]}. \quad (5)$$

In an embodiment, a network hub employs an iterative function to determine an optimized slow-fading precoding coefficient $a_j^{[kv]}$. In particular, the network hub may employ a quasi-convex optimization function to determine $SINR_{inf}^{(0)}$, an SINR value for which the quasi-convex optimization function does not have a feasible slow-fading precoding coefficient $a_j^{[kv]}$, and $SINR_{fea}^{(0)}$, an SINR value for which there exists a feasible slow-fading precoding coefficient $a_j^{[kv]}$. One skilled in the art will also note that the example quasi-convex optimization function is for illustrative purposes only, and that a variety of other iterative-type functions also may be employed by a base station to determine an optimized slow-fading precoding coefficient $a_j^{[kv]}$.

Figure 4:
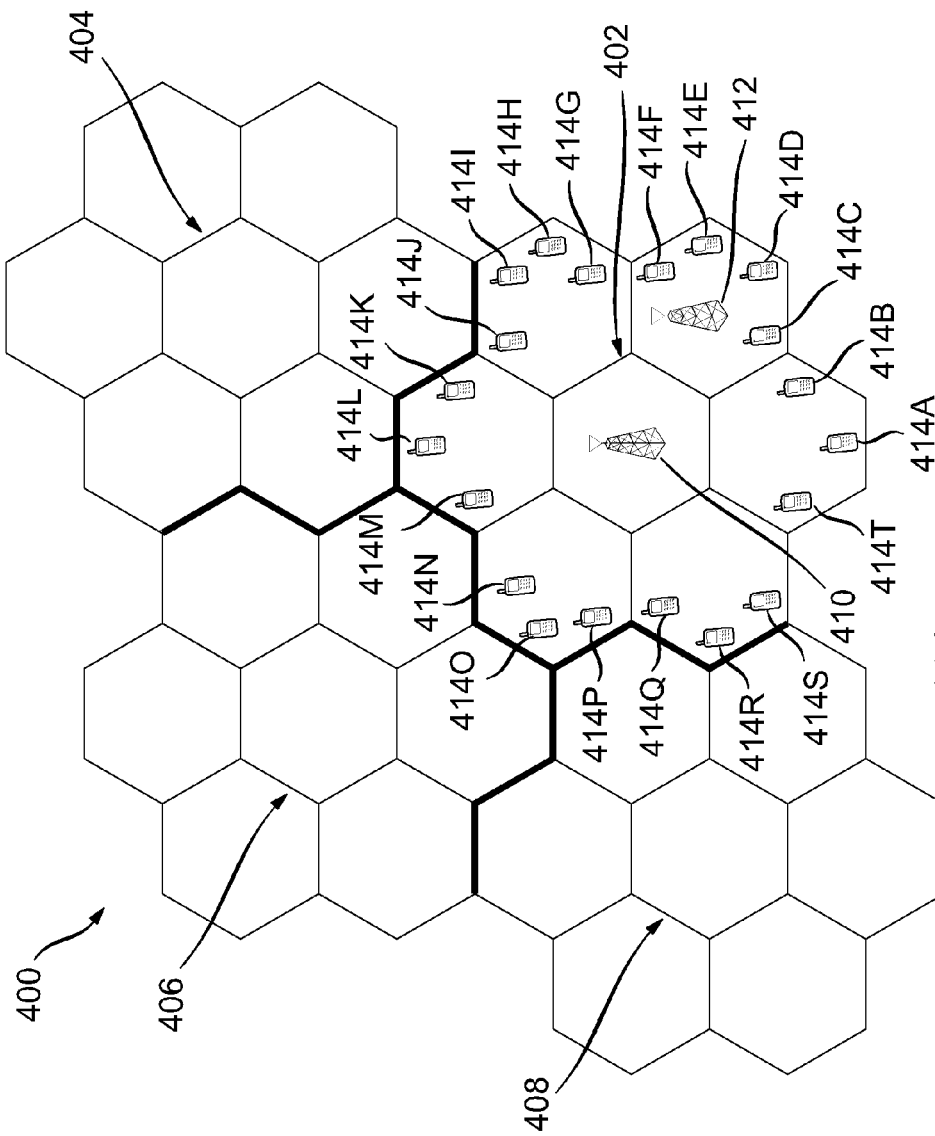
FIG. 4 is a schematic drawing of a portion of an LSAS network in which clustered slow-fading precoding is used to mitigate inter-cluster interference due to pilot contamination.

FIG. 4 is a schematic drawing of a portion of an LSAS network in which clustered slow-fading precoding is used to mitigate inter-cluster interference due to pilot contamination. In FIG. 4, cellular network 400 may be partitioned into a plurality of clusters, e.g., clusters 402, 404, 406 and 408, each comprising a selected number L of neighboring cells. For example, network 400 includes clusters 402, 404, 406 and 408 wherein the number of cells in each cluster L=7. Within each cluster, a central base station, e.g., base station 410 in cluster 402, may play the role of a network hub and compute the slow fading precoding coefficients $a_j^{[kv]}$ for all of the base stations within the cluster, e.g. base station 410 may determine optimal slow fading coefficients $a_j^{[kv]}$ for base station 412 in cluster 402. In general, the configuration of network 400 allows for significant reduction of forward-link signal interference within a given cluster, e.g., between base station 410 and base station 412. Moreover, if a network includes a relatively small number of clusters (e.g., 1-3 clusters, such as for a small town or a closed network designated area) a high data transmission rate may be achieved between base stations and terminals within each cluster.

However, terminals, e.g., terminals 414A-T, located along a perimeter of a cluster may suffer from inter-cluster interference (e.g., similar to the inter-cell interference described above) from neighboring clusters, since previous methods of slow-fading precoding used within each cluster will not mitigate this type of interference. For example, terminals 414A-T within cluster 402 may suffer from inter-cluster interference from clusters 404, 406 and 408. Moreover, the number of terminals located along a cluster perimeter is typically large, e.g., in the case of a large network in which there are many clusters. Thus, a significant portion of terminals may be served with relatively low data transmission rates. Further, increasing the cluster size to lower the amount of terminals located along a cluster perimeter will also increase the size of the cluster perimeter, making it more likely that a larger number of terminals will be located relatively near to a cluster perimeter at a given time. In addition, larger clusters may require cooperation between relatively larger numbers of base stations, which also can increase complexity. However, a decentralized cluster-free approach to network partitioning may be implemented to significantly improve data transmission rates for all terminals in a network.

Figure 5:
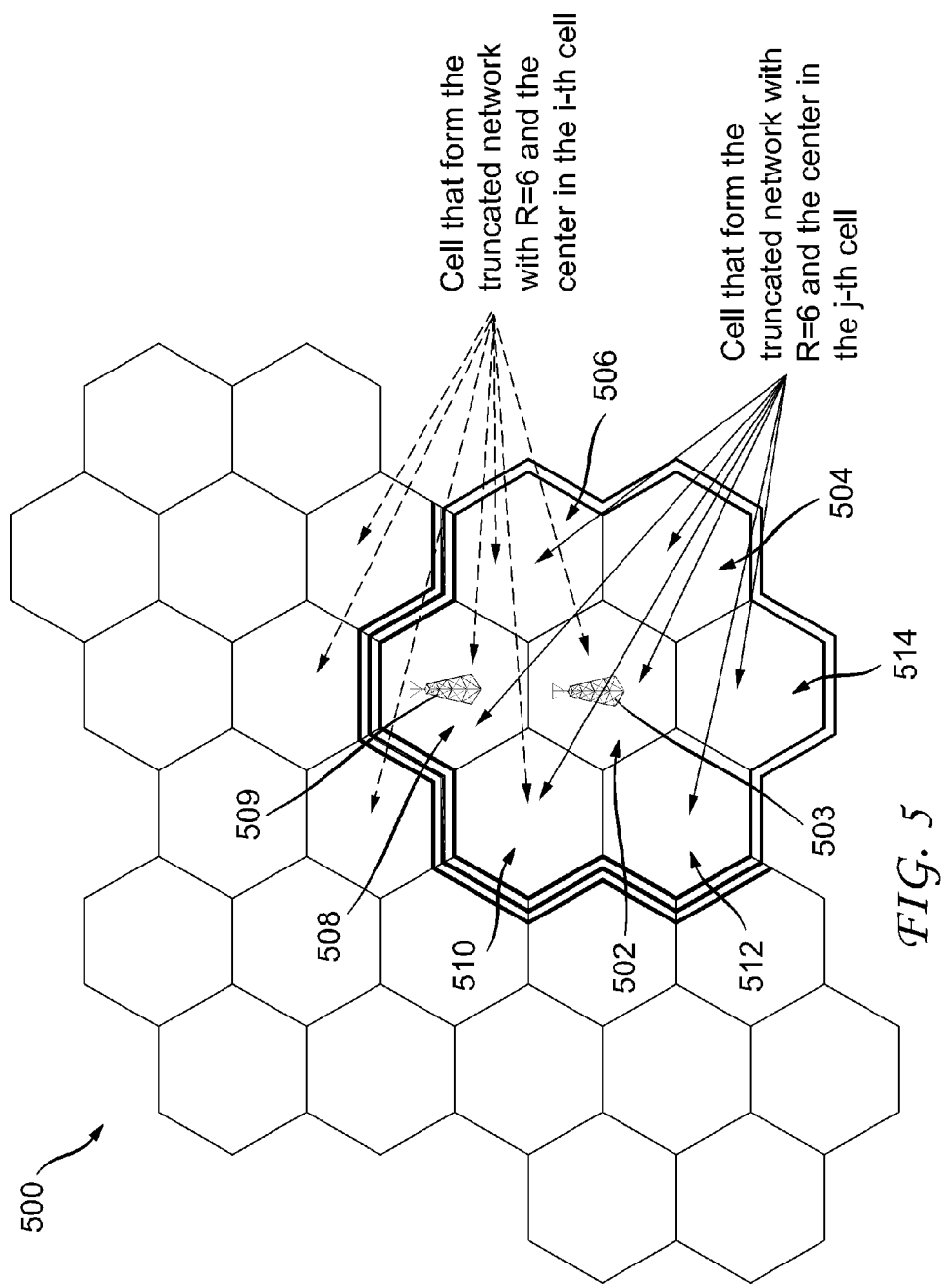
FIG. 5 is a schematic drawing of a truncated LSAS network in which decentralized slow-fading precoding may be performed in accordance with an embodiment.

FIG. 5 is a schematic drawing of a truncated LSAS network in which decentralized slow-fading precoding may be performed in accordance with an embodiment. In network 500, each base station is configured to implement a decentralized slow fading precoding method by defining its own truncated (i.e., virtual) network, comprising a same-cell and one or more neighboring cells R, and serving as the network hub of this truncated network. For example, if in the j-th cell 502, base station j 503 selects five neighboring cells (R=6) for its truncated network, the truncated network R+1 may include cells 504, 506, 508, 510, 512 and 514 in addition to the j-th cell 502. Moreover, base station j 503 may select various other neighboring cells R to be included in truncated network R+1, including cells that are not directly adjacent to the j-th cell 502. As such, one or more of the same-cell (j-th cell 502) or the one or more neighboring cells R may be selected by a neighboring-cell base station to comprise a neighboring truncated network that intersects with the truncated network R+1 defined by base station j 503, thereby allowing for the mitigation of interference for terminals located along a perimeter of the truncated network R+1.

Within the truncated network R+1, each of the R+1 base stations (i.e., base station j 503 in cell 502, base station i 509 in cell 508, and base stations in cells 504, 506, 510, 512 and 514, which are not shown in FIG. 5 for the sake of clarity) estimate the slow-fading coefficients between themselves and all the users located in the truncated network (R+1). The base stations further exchange the estimates of the slow-fading coefficients with the network hub of the truncated network, e.g., with base station j 503, which plays the role of the network hub. The network hub, e.g. base station j 503, determines all, jointly optimal, $K(R+1)^2$ slow-fading precoding coefficients for the base stations within the truncated network R+1 as if cells 502-514 were the entire cellular network. One exemplary method for determining slow fading precoding coefficients is described in U.S. patent application Ser. No. 13/751,470, entitled "Slow-Fading Precoding for Multi-Cell Wireless Systems", which is incorporated herein by reference. Base station j 503 collects all data signals $s^{[kj]}$ intended for transmission to all the terminals located within the truncated network (R+1), but not data signals intended for transmission to terminals located outside of the truncated network. Base station j 503 then uses only K(R+1), of $K(R+1)^2$, slow-fading precoding coefficients needed to transmit data from base station j 503 to the terminals located within the truncated network as if cells 502-514 were the entire cellular network.

In an embodiment, base station j 503 is configured to transmit forward-link signals to the terminals located within the truncated network (R+1) using only its own slow-fading precoding coefficients. Other base stations form their own truncated networks and serve as the network hubs of their respective truncated networks. For example, base station i 509 within cell 508, forms its own truncated network, serves as the hub of the truncated network and determines slow-fading precoding coefficients for its truncated network. As such, the base stations transmit forward-link signals to terminals within their truncated networks using only their own slow-fading precoding coefficients. For example, base station i 509 transmits forward-link signals to the terminals located within the truncated network formed by R=6 neighboring cells of cell 508 using slow-fading precoding coefficients that are determined independently from those of base station j 503.

Figure 6:
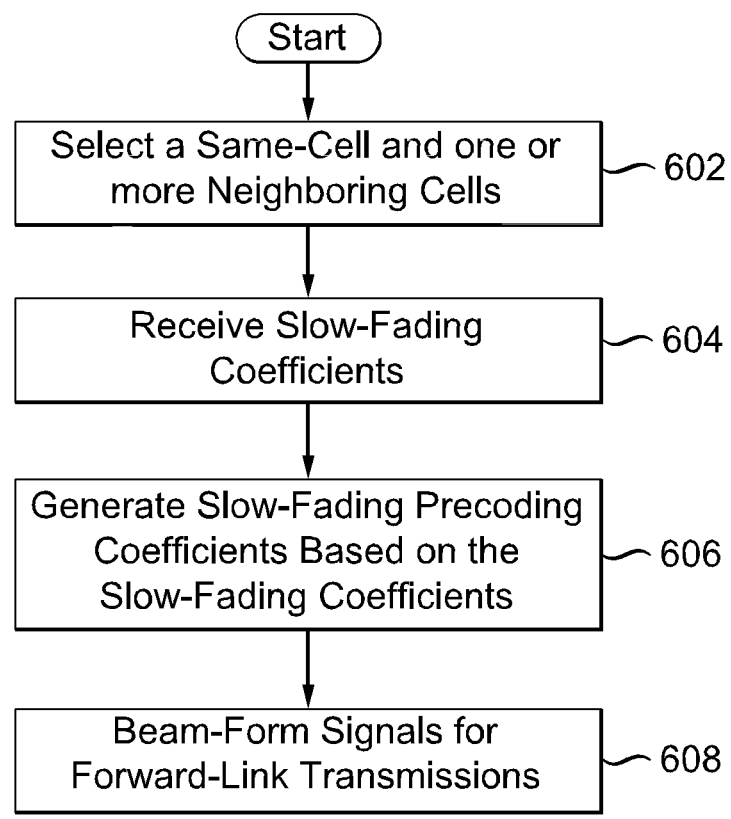
FIG. 6 illustrates a flow diagram for decentralized slow-fading precoding in accordance with an embodiment.

The preceding discussion is summarized in FIG. 6. FIG. 6 illustrates a flow diagram for decentralized slow-fading precoding in accordance with an embodiment. FIG. 6 illustrates one possible procedure for processing the forward-link signals, which is meant to be exemplary and not limiting. Each base station in the network carries out the procedure illustrated in the figure. FIG. 6 can be viewed in conjunction with FIG. 5 and is directed to the steps of the procedure as performed by one representative base station, namely base station j 503 located in the j-th cell 502.

At 602, base station j 503 selects a same-cell (the j-th cell 502) and one or more neighboring cells R within the cellular network, the same-cell and one or more neighboring cells comprising a truncated (i.e., virtual) network R+1. As such, for the purposes of the embodiments herein, the cellular network comprises only R+1 cells with respect to base station j 503. For example, if base station j 503 selects six neighboring cells (R=6), the truncated network R+1 may include cells 502, 504, 506, 508, 510, 512 and 514 as shown in FIG. 5. Base station j 503 may enumerate the R+1 cells, e.g., by assigning an index 1 to itself and, thereafter, incrementing indices to cells 504, 506, 508, 510, 512 and 514.

At 604, base station j 503 and receives slow-fading coefficients $\beta_j^{[kr]}$, j=1 ... R+1; r=1, ..., R+1; k=1, ... K; between the R+1 base stations and the terminals within the truncated network to determine slow fading precoding coefficients $a_j^{[kl]}$, j=1 ... R+1; l=1, ..., R+1; k=1, ... K based on the slow fading coefficients $\beta_j^{[kr]}$ for all terminals located within the truncated network R+1.

At 606, base station j 503 generates jointly optimized slow-fading precoding coefficients $a_j^{[kl]}$, j=1 ... R+1; l=1, ..., R+1; k=1, ... K based on the slow-fading coefficients $\beta_j^{[kr]}$, j=1 ... R+1; r=1, ..., R+1; k=1, ... K. The slow-fading precoding coefficients $a_j^{[kl]}$, j=1 ... R+1; l=1, ..., R+1; k=1, ... K are jointly optimized such as if cells 502-514 were the entire cellular network. One skilled in the art will note that any method for generating slow-fading precoding coefficients for an entire network can be used herein to generate slow-fading precoding coefficients. Any such method would be applied to the truncated network such as if it were the entire network. For example, slow-fading precoding coefficients may be generated based on maximizing a sum of data transmission rates (i.e., a sum rate) with which terminals are served in the truncated network, maximizing a sum of logarithms of data transmission rates or based on other methods. In accordance with the method for generating slow-fading precoding coefficients presented in U.S. patent application Ser. No. 13/751,470 and incorporated herein by reference, base station/503 may compute the i-th iteration of $SINR^{(i)}=(SINR_{fea}^{(i-1)}+SINR_{inf}^{(i-1)})/2$ to determine the feasibility of $SINR^{(i)}$, e.g., by performing a semi-definite programming procedure to determine the feasibility of $SINR^{(i)}$. If $SINR^{(i)}$ is feasible, base station j assigns $SINR_{fea}^{(i)}=SINR^{(i)}$, $SINR_{inf}^{(i)}=SINR_{inf}^{(i-1)}$. Otherwise, base station j assigns $SINR_{inf}^{(i)}=SINR^{(i)}$, $SINR_{fea}^{(i)}=SINR_{inf}^{(i-1)}$.

Base station j 503 can determine to stop the iterative process if $SINR_{inf}^{(i)}-SINR_{fea}^{(i)}<\Delta$ where $\Delta$ is a parameter to control the precision (i.e., a precision control threshold). In such case, the now optimal slow-fading precoding coefficient $a_j^{[kv]}$ will have been obtained. If $SINR_{inf}^{(i)}-SINR_{fea}^{(i)})\geq\Delta$, base station j 503 will continue the iterative process for the next (i+1-th) iteration.

If the iterative process has been stopped and the optimal slow-fading precoding coefficient $a_j^{[kv]}$ has been obtained, base station j 503 beam-forms signals for forward-link transmissions to one or more same-cell and neighboring-cell terminals within the truncated network R+1 based on the optimal slow-fading precoding coefficient $a_j^{[kv]}$ to achieve $SINR_{fea}^{(i)}$, (e.g., after obtaining pilot signals from each terminal) at 608. Although one skilled in the art will recognize that various methods may be used for implementing a forward-link transmission, one exemplary but not limiting example is the forward-link transmission approach that is described in Marzetta 2010.

The various embodiments herein for decentralized slow fading precoding may significantly reduce inter-cell interference for forward-link signal transmissions to one or more same-cell and neighboring-cell terminals located within a truncated network. For terminals located outside of a truncated network, interference may be mitigated due to the remote proximity of these cells with respect to a base station transmitting forward-link signals using the optimal slow-fading precoding coefficient $a_j^{[kv]}$. Moreover, decentralized slow fading precoding can mitigate issues associated with terminals located along a truncated network/cluster perimeter and may allow for a more uniformly high data transmission rate for forward-link signal transmissions to all terminals in a cellular network.

Various of the mathematical computations described above, including the computation of the pilot contamination precoding matrix, may be performed by digital processors situated at individual base stations, or by digital processors situated at a central unit, or by a combination of digital processors situated in various ways. Without limitation, the digital processor may be any of general or special purpose digital computers, microprocessors, digital signal processors, or the like, acting under controls embodied in software, firmware, or hardware.

It will be understood that various approximations and alternative algorithms and mathematical formulations not explicitly described above may be used in implementations, without departing from the principles described above. Not least of these would be the setting of certain quantities, such as measured values of propagation coefficients, to zero if their values lie below an appropriate threshold.

It should also be understood that we have used the term "cell" in a broad sense to mean a cell, a sector, or any similar defined reception area within a wireless network.

Further, in various embodiments a base station may comprise one or more modules adapted for performing the features described herein. It should be understood in this regard that a module may be a specialized circuit or combination of circuits, or may be a set of instructions recorded in a machine-readable memory, together with general-purpose or special-purpose circuitry capable of carrying out the recorded instructions. In addition, one or more of the features described herein may be performed at nodes of the network that are distinct from the base stations, at several base stations (either individually or collectively), or at a combination of nodes and base stations.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 6, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
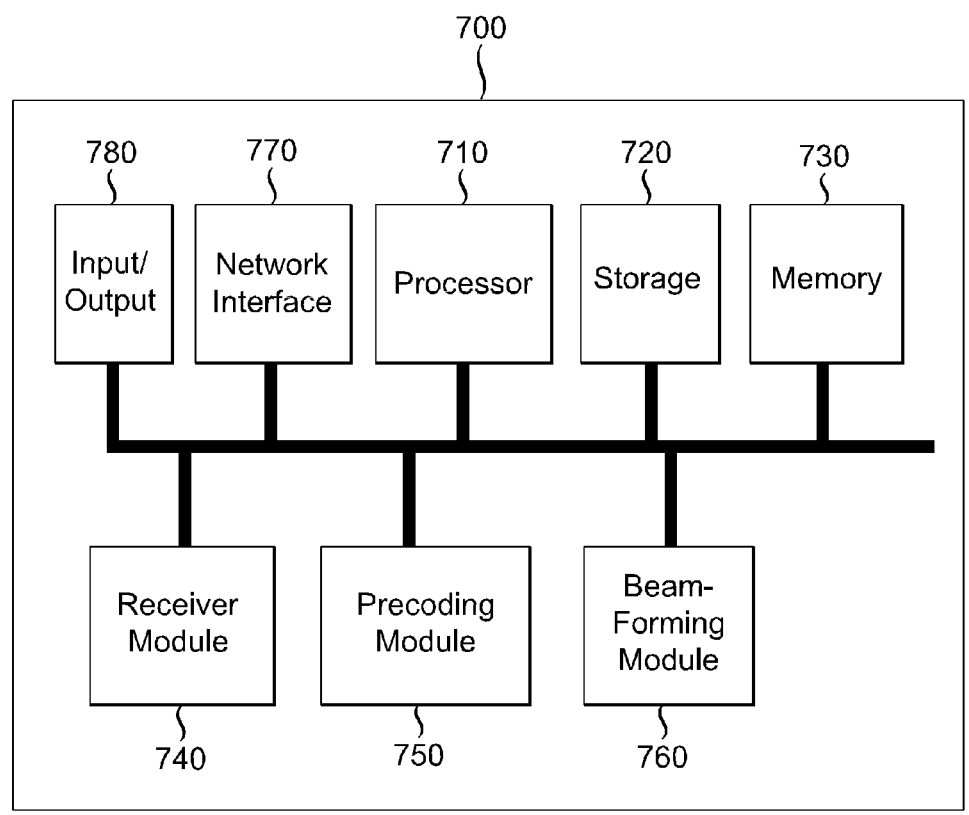
FIG. 7 is a high-level block diagram of a base station apparatus that may be used for performing various embodiments herein.

A high-level block diagram of an exemplary base station apparatus that may be used to implement systems, apparatus and methods described herein is illustrated in FIG. 7. Base station apparatus 700 comprises a processor 710 operatively coupled to a data storage device 720 and a memory 730. Processor 710 controls the overall operation of base station apparatus 700 by executing computer program instructions that define such operations. The computer program instructions may be stored in data storage device 720, or other computer-readable medium, and loaded into memory 730 when execution of the computer program instructions is desired. For example, receiver module 740 adapted for obtaining a plurality of slow-fading coefficients, precoding module 750 adapted for generating a set of slow-fading precoding coefficients, and beam-forming module 760 for transmitting signals to same-cell terminals may comprise one or more components of computer 700. Thus, the method steps of FIG. 6 can be defined by the computer program instructions stored in memory 730 and/or data storage device 720 and controlled by processor 710 executing the computer program instructions. For example, the computer program instructions can be implemented as computer executable code programmed by one skilled in the art to perform an algorithm defined by the method steps of FIG. 6. Accordingly, by executing the computer program instructions, the processor 710 executes an algorithm defined by the method steps of FIG. 6. Base station apparatus 700 also includes one or more network interfaces 770 for communicating with other devices via a network. Base station apparatus 700 may also include one or more input/output devices 780 that enable user interaction with base station apparatus 700 (e.g., display, keyboard, mouse, speakers, buttons, etc.).

Processor 710 may include both general and special purpose microprocessors, and may be the sole processor or one of multiple processors of base station apparatus 700. Processor 710 may comprise one or more central processing units (CPUs), for example. Processor 710, data storage device 720, and/or memory 730 may include, be supplemented by, or incorporated in, one or more application-specific integrated circuits (ASICs) and/or one or more field programmable gate arrays (FPGAs).

Data storage device 720 and memory 730 each comprise a tangible non-transitory computer readable storage medium. Data storage device 720, and memory 730, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 780 may include peripherals, such as a printer, scanner, display screen, etc. For example, input/output devices 780 may include a display device such as a cathode ray tube (CRT), plasma or liquid crystal display (LCD) monitor for displaying information to the user, a keyboard, and a pointing device such as a mouse or a trackball by which the user can provide input to base station apparatus 700.

Any or all of the systems and apparatus discussed herein, including receiver module 740, precoding module 750, and beam-forming module 760 may be performed by a base station such as base station apparatus 700.

One skilled in the art will recognize that an implementation of an actual computer or computer system may have other structures and may contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. A method for transmitting signals in a cellular network comprising a plurality of base stations, each of the plurality of base stations serving respective pluralities of same-cell terminals and neighboring-cell terminals, the method comprising:

for each respective base station of the plurality of base stations:
selecting a same-cell and one or more neighboring cells within the cellular network, the selected same-cell and one or more neighboring cells comprising a truncated network;
obtaining a plurality of slow-fading coefficients, each of the plurality of slow-fading coefficients being associated with channel state information for communication within the truncated network between a neighboring-cell base station and one of the respective pluralities of same-cell terminals and neighboring-cell terminals; and
generating a set of slow-fading precoding coefficients for transmitting the signals within the truncated network to the respective pluralities of same-cell terminals and neighboring-cell terminals based on the plurality of slow-fading coefficients,
wherein the respective generated set of slow-fading precoding coefficients is used for transmitting the signals by the respective base station of the plurality of base stations without using sets of slow-fading precoding coefficients generated by other base stations of the plurality of base stations.

2. The method of claim 1, wherein one or more of the same-cell and the one or more neighboring cells are selected for each respective base station of the plurality of base stations to comprise a plurality of neighboring truncated network that intersect with each other.

3. The method of claim 1, wherein generating the set of slow-fading precoding coefficients comprises determining optimized slow-fading precoding coefficients.

4. The method of claim 3, wherein each optimized slow-fading precoding coefficient is determined based on at least one of:
maximizing a minimum signal to interference and noise ratio,
maximizing a sum of data transmission rates, and
maximizing a sum of logarithms of data transmission rates for transmitting a signal to same-cell terminals and other-cell terminals.

5. The method of claim 3, wherein generating the set of slow-fading precoding coefficients includes performing an iterative function, wherein the iterative function is terminated based on a precision control threshold.

6. The method of claim 5, wherein the iterative function includes a quasi-convex optimization algorithm.

7. The method of claim 1, further comprising receiving data signals, by the respective base station, intended for one or more of the same-cell terminals and neighboring-cell terminals located within the truncated network.

8. The method of claim 1 wherein the respective base station comprises a central hub of the truncated network.

9. The method of claim 1 further comprising, for each respective base station:
obtaining pilot signals from the pluralities of same-cell terminals and neighboring-cell terminals; and
beam-forming signals to one or more of the same-cell terminals and neighboring-cell terminals based on the set of slow-fading precoding coefficients.

10. The method of claim 9 wherein the beam-forming is based on a set of fast-fading coefficients.

11. The method of claim 9 wherein the beam-forming is performed using OFDM modulation.

12. A cellular network, comprising:
a plurality of base stations each serving respective pluralities of same-cell terminals and other-cell terminals in the cellular network;
each respective base station of the plurality of base stations comprising:
a processor configured to select a same-cell and one or more neighboring cells within the cellular network, the selected same-cell and one or more neighboring cells comprising a truncated network;
a receiver module configured to obtain a plurality of slow-fading coefficients, each of the plurality of slow-fading coefficients being associated with channel state information for communication within the truncated network between a neighboring-cell base station and one of the respective pluralities of same-cell terminals and neighboring-cell terminals; and
a precoding module configured to generate a set of slow-fading precoding coefficients for transmitting the signals within the truncated network to the respective pluralities of same-cell terminals and neighboring-cell terminals based on the plurality of slow-fading coefficients, wherein the respective generated set of slow-fading precoding coefficients is used for transmitting the signals by the respective base station of the plurality of base stations without using sets of slow-fading precoding coefficients generated by other base stations of the plurality of base stations.

13. The cellular network of claim 12, wherein generating the set of slow-fading precoding coefficients comprises determining optimized slow-fading precoding coefficients.

14. The cellular network of claim 13, wherein each optimized slow-fading precoding coefficient is determined based on at least one of:
   maximizing a minimum signal to interference and noise ratio,
   maximizing a sum of data transmission rates, and
   maximizing a sum of logarithms of data transmission rates for transmitting a signal to same-cell terminals and other-cell terminals.

15. The cellular network of claim 13, wherein generating the set of slow-fading precoding coefficients includes performing an iterative function, wherein the iterative function is terminated based on a precision control threshold.

16. The cellular network of claim 15, wherein the iterative function includes a quasi-convex optimization algorithm.

17. The cellular network of claim 12, wherein the receiver module of each respective base station is further configured to receive data signals intended for one or more of the same-cell terminals and neighboring-cell terminals located within the truncated network.

18. The cellular network of claim 12 wherein the respective base station comprises a central hub of the truncated network.

19. The cellular network of claim 12, wherein:
   the receiver module of each respective base station is further configured to obtain pilot signals from the pluralities of same-cell terminals and neighboring-cell terminals; and
   a beam-forming module of each respective base station is configured to beam-form signals to one or more of the same-cell terminals and neighboring-cell terminals based on the set of slow-fading precoding coefficients.

20. The cellular network of claim 19 wherein the beam-forming is based on a set of fast-fading coefficients.

21. The cellular network of claim 19, wherein the beam-forming is performed using OFDM modulation.

\* \* \* \* \*